_United States Patent Office_ 3,107,521
Patented Oct. 22, 1963

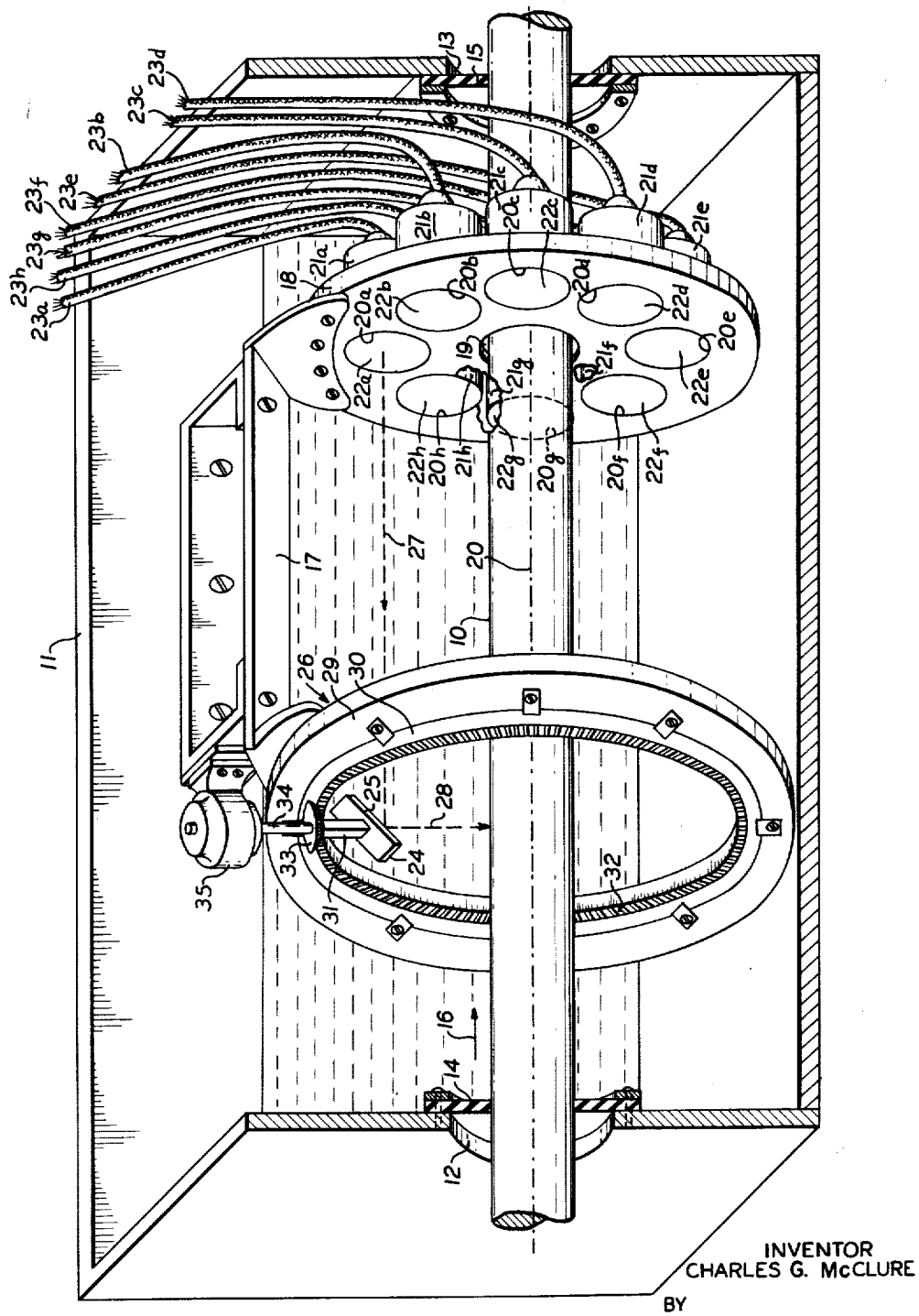

3,107,521
ULTRASONIC INSPECTION APPARATUS
Charles G. McClure, Brookfield, Conn., assignor, by mesne assignments, to Automation Industries, Inc., El Segundo, Calif., a corporation of California
Filed Jan. 11, 1961, Ser. No. 82,066
5 Claims. (Cl. 73—67.8)

This invention relates to ultrasonic inspection apparatus, and, more particularly, pertains to a new and improved object-scanning system for such apparatus.

In ultrasonic inspection a transducer is acoustically coupled to an object under test and is energized with pulses of ultrasonic energy so that wave energy is propagated into the object. Reflections from discontinuities or defects cause pulses of ultrasonic wave energy to return to the transducer and these are converted to electrical pulse signals which are supplied to an appropriate indicator where the timing of the returning pulses with respect to the emitted pulses indicates the distance to the discontinuities or deflects. In order to explore the entirety of an object under test, the transducer and the object are moved relative to one another. However, the size and/or configuration of the test object may make exploration of the test object difficult.

It is, therefore, an object of the present invention to provide a new and improved object-scanning system for ultrasonic inspection apparatus.

An other object of the present invention is to provide a new and improved object-scanning system for ultrasonic inspection apparatus which does not require relative movement between the transducer and the object under test for a particular mode of scanning action.

A further object of the present invention is to provide a new and improved object-scanning system for ultrasonic inspection apparatus especially adapted for the exploration of any elongated test object.

An object-scanning system for ultrasonic inspection apparatus in accordance with the present invention comprises a plurality of transducers each having an ultrasonic-wave-emitting surface. The transducers are disposed with their ultrasonic-wave-emitting surfaces defining a surface of annular configuration. The system further comprises reflector means which includes an ultrasonic-wave-reflecting surface operatively disposed relative to the ultrasonic-wave-emitting surfaces of the transducers in spaced, non-parallel relation to the aforesaid surface of annular configuration. The reflector means is supported for movement along a path substantially coextensive with the surface of annular configuration and means are provided for displacing the reflector means along that path thereby to scan a path along an object under inspection.

The novel features of the present invention are set forth with particularity in the appended claims. The present invention, both as to its organization and manner of operation, together with further objects and advantages thereof, may best be understood by reference to the following description taken in connection with the accompanying drawings in which the single FIGURE is a perspective view of an object-scanning system for ultrasonic inspection apparatus constructed in accordance with the present invention.

As shown in the drawing, an object-scanning system embodying the present invention may be conveniently employed to inspect an elongated object 10 which may be of long, cylindrical configuration. Test object 10 is disposed, in part, within a container or tank 11 adapted is disposed, in part, with as appropriate liquid or couplant, such as water, the purpose of which will be more apparent in the discussion to follow. The test object 10 passes through openings 12 and 13 in opposite end walls of the container 11 and appropriate seals 14 and 15 constructed, for example, of rubber maintain the fluid integrity of container 11 while permitting the cylindrical test object 10 to be displaced through the container longitudinally in the direction of arrow 16.

A bracket 17 is fastened to the wall of container 11 and is connected to and supports a disc-shaped support member 18. Support member 18 has a central opening 19 through which test object 10 passes and the support lies in a plane perpendicular to longitudinal axis 20 of test object 10. Support member 18 has a plurality of circular openings $20a-20h$ which are distributed about axis 20 in a uniform array. The openings $20a-20h$ form seats for and receive respective ones of cylindrical housings of conventional transducers $21a-21h$. Each housing encloses a transducer element (not shown) which may be piezo-electric crystal and the housings have ultrasonic-wave-emitting faces or surfaces $22a-22h$. By appropriately selecting the diameter of the openings $20a-20h$ in relation to the outer diameter of the housings the transducers may be press-fit into place so that each seat tightly receives and supports its transducer. The seats are distributed about an annular path around axis 20 and thus the transducers are fixed in space with ultrasonic-wave-emitting surfaces $22a-22h$ disposed in a common plane perpendicular to axis 20.

Electrical cables $23a-23h$ extend to the transducers $21a-21h$ so that they can be electrically connected to the electrical circuit portion (not shown) of apparatus. For example, apparatus of the type disclosed in Patent No. 2,507,854 may be employed to generate pulses of electrical energy which are supplied to the transducer $21a-21h$ via cables $23a-23h$ thereby to energize the transducers simultaneously in like phase relation to one another. An appropriate amplifier is also connected to the transducers $22a-22h$ via cables $23a-23h$ and an indicator is coupled to the amplifier. Since the electrical apparatus for performing these functions is conventional and does not form a part of the present invention a detailed description herein is deemed unnecessary.

The portion of the apparatus embodying the present invention as thus-far described includes a plurality of transducers which are maintained fixed in space and which when energized produce a plurality of beams of ultrasonic wave energy in the liquid of container 11. These beams are parallel to axis 20.

In order to scan object 10 with such ultrasonic-wave energy, apparatus embodying the present invention also includes reflector means 24 having an ultrasonic-wave-reflecting surface 25. The reflector means 24 is carried by a support 26 that is mounted on bracket 17 in a position opposite to support 18. The reflector means 24 is positioned so that surface 25 is in spaced, non-parallel relation to the plane of ultrasonic-wave-emitting surfaces $21a-21h$; for example, surface 25 may be inclined at an angle of 45° to that surface. Other angles, however, are obviously suitable. Surface 25 should have an area of the same order of size as the area of one of the ultrasonic-wave-emitting surfaces. Selection of size and material for reflector 24 are believed to be well within the province of one skilled in that art. In general, the system is arranged so that, with respect to surface 21a of transducer 21a, ultrasonic wave enrgy is emitted in the direction of a line 27 parallel to axis 20 and after striking reflector surface 25 such wave energy is reflected or re-directed along a line 28 perpendicular to axis 20.

Support means 26 is comprised of an outer ring 29 that is fixed to bracket 17. Ring 29 supports an inner ring 30 for rotational movement therein and the reflector 24 is secured to inner ring 30 by a post 31. A ring gear 32 on inner ring 30 is in meshing engagement with a pinion 33 secured to shaft 34 of a driving motor 35. Thus, when motor 35 is energized ring 30 is rotated about axis 20 and the reflector means 24 is displaced along a path substantially coextensive with the surface of annular configuration that is defined by the ultrasonic-wave-emitting surfaces of surfaces 22a–22h. It is evident, that by such displacement of the reflector means 24 a line in ultrasonic-wave-reflecting surface 25 develops a right, frustoconical surfaces of revolution centered on axis 20.

In operation, the transducers 21a–21h are connected in like phase relation to the electrical circuit portion of conventional ultrasonic inspection apparatus (not shown) and motor 35 is energized. The transducers convert electrical energy into beams of ultrasonic wave energy which are propagated through the liquid of container 11 in respective directions parallel to axis 20, such as the direction indicated for transducer 21a by broken line 27. Reflector means reflects or re-directs ultrasonic-wave energy toward the axis 20 of test object 10, as illustrated by broken line 28, and as it rotates, it is evident that an annular path around the test object is scanned. Since the rate of rotation of ring 30 is very much slower than the rate at which ultrasonic wave energy is propagated, a reflection of ultrasonic wave energy from a discontinuity or defect within test object 10 is returned toward the transducer from which it is emitted via reflector 24 and appropriate indications of such defect or discontinuity are presented.

Obviously, ultrasonic-wave energy from each of the transducers is reflected from the opposite end wall of container 11 and such reflections also produce indications. By appropriately spacing the end wall from the transducers these indications can be made to occur outside the viewing range on the indicator in which indications from within the test object 10 are anticipated. However, if desired the opposite end wall may be coated with a sound-absorbing material so as to eliminate reflections. Alternatively, suitable time-gating may be provided in a manner described in the above-mentioned Patent No. 2,507,854 so that indications from the opposite end wall are not presented.

As the test object is scanned along an annular path, it is also displaced by hand or by an appropriate mechanism (not shown) in a direction of arrow 16. In this way, the entirety of the test object is explored.

From the foregoing description, it may be seen that through the use of an object-scanning system embodying the present invention, the test object 10 may be explored in a highly convenient manner. Thus, in applications where the test object is extremely long or otherwise of a configuration so as to make rotation prohibitive, it may be inspected with speed and facility. Moreover, since the transducers need not be displaced, complexities which occur because of their electrical cables are avoided.

It is to be understood that where reference is made to a transducer in its function of the conversion of electrical energy to wave energy, the theorem of reciprocity applies, and the transducer function of converting wave energy to electrical energy may also occur. While a particular embodiment of the present invention has been shown and described, it is apparent that changes and modifications may be made without departing from this invention in its broader aspects, and therefore the aim in the appended claims is to cover all such changes and modifications as fall within the true spirit and scope of this invention.

What is claimed is:

1. An object-scanning system for ultrasonic inspection apparatus comprising: a plurality of transducers each having an ultrasonic-wave-emitting surface, said transducers being disposed so that the plurality of ultrasonic-wave-emitting surfaces are arranged generally in an annular configuration about an axis intercepting a test object; reflector means including an ultrasonic-wave-reflecting surface operatively disposed relative to said ultrasonic-wave-emitting surfaces in spaced, non-parallel relation to said plurality of surfaces, positioned to reflect ultrasonic wave energy toward an object under inspection and supported for movement along a path about said axis substantially coextensive with said plurality of surfaces; and means for displacing said reflector means along said path thereby effectively to scan a path along the object under inspection.

2. An object-scanning system for ultrasonic inspection apparatus comprising: a plurality of transducers each having an ultrasonic-wave-emitting surface, said transducers being disposed so that the plurality of ultrasonic-wave-emitting surfaces are arranged generally in an annular configuration about an axis intercepting a test object; reflector means including an ultrasonic-wave-reflecting surface operatively disposed relative to said ultrasonic-wave-emitting surfaces in spaced, non-parallel relation to said plurality of surfaces, positioned to reflect ultrasonic wave energy toward an object under inspection and supported for movement along an annular path about said axis; and means for displacing said reflector means along said path thereby effectively to scan a path along the object under inspection.

3. An object-scanning system for ultrasonic inspection apparatus comprising a plurality of transducers each having an ultrasonic-wave-emitting surface, said transducers being disposed so that the plurality of ultrasonic-wave-emitting surfaces are arranged generally in an annular configuration about an axis intercepting a test object; means for energizing said transducers simultaneously in like phase relation to one another; reflector means including an ultrasonic-wave-reflecting surface operatively disposed relative to said ultrasonic-wave-emitting surfaces in spaced, non-parallel relation to said plurality of surfaces, positioned to reflect ultrasonic wave energy toward an object under inspection and supported for movement along an annular path about said axis substantially coaxially oriented with respect to said plurality of surfaces; and means for displacing said reflector means along said path thereby effectively to scan a path along the object under inspection.

4. An object-scanning system for ultrasonic inspection apparatus comprising: a plurality of transducers, each having an essentially-flat ultrasonic-wave-emitting surface; a first support having a plurality of seats, each supporting a respective one of said transducers, said seats being distributed about an annular path about an axis intercepting a test object and maintaining said transducers in fixed relation so that the plurality of of ultrasonic-wave-emitting surfaces of said transducers are disposed in a common plane; a reflector having an ultrasonic-wave-reflecting surface; a second support for supporting said reflector for movement about an annular path about said axis with said ultrasonic-wave-reflecting surface disposed at an angle to said common plane and positioned to reflect ultrasonic wave energy toward an object under inspection; and means for displacing said reflector along said secondmentioned path thereby effectively to scan a path along the object under inspection.

5. An object-scanning system for ultrasonic inspection apparatus comprising: a plurality of transducers each having an ultrasonic-wave-emitting surface, said transducers being disposed so that the plurality of ultrasonic-wave-emitting surfaces are generally in an annular configuration about an axis intercepting a test object; reflector means including an ultrasonic-wave-reflecting surface operatively disposed relative to said ultrasonic-wave-emitting surfaces in spaced, non-parallel relation to said plurality of surfaces and supported for movement along a path about said axis substantially coextensive with said plurality of surfaces; said ultrasonic-wave-reflecting surface being oriented so as to reflect ultrasonic-wave energy emitted by said transducer in a direction toward said axis, being a common axis for said surface of annular configuration and said path; and means for displacing said reflector means along said path thereby effectively to scan a path along an object under inspection extending along said common axis.

References Cited in the file of this patent

FOREIGN PATENTS 1,193,044     France                Apr. 27, 1959

OTHER REFERENCES

German printed application of Liebl et al. V8370IX/42k, Oct. 11, 1956.

UNITED STATES PATENT OFFICE
CERTIFICATE OF CORRECTION

Patent No. 3,107,521　　　　　　　　　　October 22, 1963

Charles G. McClure

It is hereby certified that error appears in the above numbered patent requiring correction and that the said Letters Patent should read as corrected below.

Column 2, line 5, for "is disposed, in part, with as" read -- to be filled with an --; column 3, line 25, for "surfaces" insert -- surface --; column 4, line 66, strike out "of", second occurrence.

Signed and sealed this 14th day of April 1964.

(SEAL)
Attest:

ERNEST W. SWIDER

Attesting Officer

EDWARD J. BRENNER

Commissioner of Patents